United States Patent
Hunzinger

(10) Patent No.: US 9,111,224 B2
(45) Date of Patent: Aug. 18, 2015

(54) METHOD AND APPARATUS FOR NEURAL LEARNING OF NATURAL MULTI-SPIKE TRAINS IN SPIKING NEURAL NETWORKS

(75) Inventor: Jason Frank Hunzinger, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 13/276,812

(22) Filed: Oct. 19, 2011

(65) Prior Publication Data

US 2013/0103626 A1 Apr. 25, 2013

(51) Int. Cl.
*G06N 3/08* (2006.01)
*G06N 3/04* (2006.01)

(52) U.S. Cl.
CPC .............. *G06N 3/049* (2013.01); *G06N 3/088* (2013.01)

(58) Field of Classification Search
CPC .......... G06N 3/08; G06N 3/088; G06N 3/049
See application file for complete search history.

(56) References Cited

U.S. PATENT DOCUMENTS

| | | | |
|---|---|---|---|
| 5,459,817 A | 10/1995 | Shima | |
| 5,666,079 A | 9/1997 | Ma | |
| 6,505,182 B1 | 1/2003 | Van | |
| 6,581,046 B1 | 6/2003 | Ahissar | |
| 7,174,325 B1 | 2/2007 | Ascoli | |
| 7,287,014 B2 | 10/2007 | Chen et al. | |
| 7,412,428 B2 | 8/2008 | Nugent | |
| 7,430,546 B1 | 9/2008 | Suri | |
| 7,512,271 B2 | 3/2009 | Matsugu et al. | |
| 7,904,398 B1 | 3/2011 | Repici | |
| 8,433,665 B2 | 4/2013 | Tang et al. | |
| 8,606,732 B2 | 12/2013 | Venkatraman et al. | |
| 8,625,337 B2 | 1/2014 | Wu et al. | |
| 8,694,452 B2 | 4/2014 | Aparin et al. | |
| 8,706,662 B2 | 4/2014 | Chan et al. | |
| 8,756,173 B2 | 6/2014 | Hunzinger et al. | |
| 2004/0097562 A1 | 5/2004 | Olesen et al. | |
| 2006/0235477 A1 | 10/2006 | Rom | |
| 2008/0208783 A1 | 8/2008 | Jaros et al. | |
| 2009/0287624 A1* | 11/2009 | Rouat et al. .............. | 706/20 |
| 2009/0313195 A1 | 12/2009 | McDaid et al. | |
| 2010/0076916 A1* | 3/2010 | van der Made .......... | 706/27 |

(Continued)

FOREIGN PATENT DOCUMENTS

| | | |
|---|---|---|
| JP | 7084978 A | 3/1995 |
| TW | 242981 | 3/1995 |

(Continued)

OTHER PUBLICATIONS

Hunzinger J. et al., "Learning complex temporal patterns with resource-dependent spike timing-dependent plasticity", J Neurophysiol 108: pp. 551-566, Apr. 2012.*

(Continued)

*Primary Examiner* — Jeffrey A Gaffin
*Assistant Examiner* — David Misir
(74) *Attorney, Agent, or Firm* — Rupit M. Patel

(57) ABSTRACT

Certain aspects of the present disclosure support a technique for neural learning of natural multi-spike trains in spiking neural networks. A synaptic weight can be adapted depending on a resource associated with the synapse, which can be depleted by weight change and can recover over time. In one aspect of the present disclosure, the weight adaptation may depend on a time since the last significant weight change.

80 Claims, 9 Drawing Sheets

(56) References Cited

U.S. PATENT DOCUMENTS

| | | | |
|---|---|---|---|
| 2010/0145402 A1 | 6/2010 | Rom | |
| 2010/0185250 A1 | 7/2010 | Rom | |
| 2010/0220523 A1 | 9/2010 | Modha et al. | |
| 2010/0235310 A1 | 9/2010 | Gage et al. | |
| 2010/0299296 A1* | 11/2010 | Modha et al. | 706/25 |
| 2010/0299297 A1* | 11/2010 | Breitwisch et al. | 706/33 |
| 2011/0137843 A1* | 6/2011 | Poon et al. | 706/33 |
| 2011/0153533 A1* | 6/2011 | Jackson et al. | 706/17 |
| 2012/0011089 A1 | 1/2012 | Aparin et al. | |
| 2012/0084241 A1 | 4/2012 | Friedman et al. | |
| 2012/0109864 A1* | 5/2012 | Modha | 706/25 |
| 2012/0150781 A1* | 6/2012 | Arthur et al. | 706/35 |
| 2013/0024409 A1 | 1/2013 | Hunzinger et al. | |
| 2013/0046716 A1 | 2/2013 | Chan et al. | |
| 2013/0073491 A1* | 3/2013 | Izhikevich et al. | 706/15 |
| 2013/0073501 A1 | 3/2013 | Hunzinger et al. | |
| 2013/0226851 A1 | 8/2013 | Hunzinger et al. | |
| 2013/0339280 A1 | 12/2013 | Hunzinger et al. | |

FOREIGN PATENT DOCUMENTS

| | | |
|---|---|---|
| WO | 9318474 A1 | 9/1993 |
| WO | 9729437 A1 | 8/1997 |

OTHER PUBLICATIONS

Froemke R. et al., "Temporal modulation of spike-timing-dependent plasticity", Frontiers in Synaptic Neuroscience, Jun. 2010, vol. 2, Article 19, pp. 1-16.*

Amemori, K.I., et al., "Self-organization of delay lines by spike-time-dependent learning", Neurocomputing, Elsevier Science Publishers, Amsterdam, NL, vol. 61, Oct. 1, 2004, pp. 291-316, XP004568343, ISSN: 0925-2312, DOI: 10.1016/J.NEUCOM.2003.09.013 p. 291-p. 315.

Arena, P., et al., "STDP with adaptive synaptic delay for robot navigation control", Proceedings of SPIE, vol. 6592, May 18, 2007, XP055049378, ISSN: 0277-786X, DOI: 10.1117/12.724204 pp. 65920J-1-pp. 65920J-9, paragraph 3.

Babadi, B., et al., "Intrinsic Stability of Temporally Shifted Spike-Timing Dependent Plasticity", PLOS Computational Biology, vol. 6, No. 11. Jan. 1, 2010, pp. el000961-el000961, XP55040430, ISSN: 1553-734X, DOI: 10.1371/joumal.pcbi 1000961 p. 1-page 13, right-hand column, paragraph 4.

Bako L., et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Bofill-I-Petit, A., et al., "Synchrony Detection and Amplification by Silicon Neurons With STDP Synapses", IEEE Transactions on Neural Networks, Service Center, Piscataway, NJ, US, vol. 15, No. 5, Sep. 1, 2004, pp. 1296-1304, XP011118617, ISSN: 1045-9227, DOI: 10.1109/TNN.2004.832842 p. 1296-p. 1303, right-hand column, paragraph 2.

Bohte S.M., et al., "Unsupervised Clustering with Spiking Neurons by Sparse Temporal Coding and Multilayer RBF Networks," in IEEE Transactions on Neural Networks, 2002, vol. 13(2), pp. 426-435.

Bothe, S.M., et al., "Reducing Spike Train Variability: A Computational Theory of Spike-Timing Dependent Plasticity", Advances in Neural Information Processing Systems (NIPS) 17, Jan. 1, 2005, pp. 201-208, XP055052246, Cambridge, MA [retrieved on Feb. 4, 2013].

Cameron, K., et al., "Spike Timing Dependent Adaptation for Mismatch Compensation", 2006 IEEE International Symposium on Circuits and Systems May 21-24, 2006 Island of Kos, Greece, IEEE—Piscataway, NJ,USA,May 21, 2006, XP010938590, DOI: 10.1109/ISCAS.2006.1692812 ISBN: 978-0-7803-9389-9, pp. 1223-1226.

Caporale, N., et al., "Spike Timing-Dependent Plasticity: A Hebbian Learning Rule", Annual Review of Neuroscience, vol. 31, No. 1, Jul. 1, 2008, pp. 25-46, XP055052234, ISSN: 0147-006X, DOI: 10.1146/annurev.neuro.31.06G407.125639 abstract; figure 1 p. 31, left-hand column, paragraph 2-p. 36, left-hand column, paragraph 1.

Clopath. et al.,. "Predicting Neuronal Activity with Simple Models of the Threshold Type: Adaptive Exponential Integrate-and-Fire Model with Two Compartments," Preprint submitted to Elsevier Science, Aug. 29, 2006, 6 pgs.

Dan et al., Spike timing-dependent review plasticity of neural circuits, Neuron, Sep. 2004, pp. 23-30, vol. 44.

Duro, et al. , "Discrete-Time Backpropagation for Training Synaptic Delay-Based Artificial Neural Networks," IEEE Transactions on Neural Networks, Vol. 10, No. 4, Jul. 1999, pp. 779-789.

Froemke, et al. "Spike-timing-dependent synaptic modification induced by natural spike trains," Division of Neurobiology, Department of Molecular and Cell Biology, UC Berkeley, Nature, letters to nature, vol. 416, Mar. 2002, 6 pgs.

Froemke, et al.,. "Temporal modulation of spike-timing-dependent plasticity," Frontiers in Synaptic Neuroscience, vol. 2, Article 19, Jun. 2010, 16 pgs.

Gilson, M., et al., "Stability versus Neuronal Specialization for STDP: Long-Tail Weight Distributions Solve the Dilemma", PL0S One, vol. 6, No. 10, Jan. 1, 2011, p. e25339, XP055052242. ISSN: 1932-6203, DOI: 10.1371/journal.pone.0025339.

Huerta et al., "Bidirectional Synaptic Plasticity Induced by a Single Burst during Cholinergic Theta Oscillation in CA1 in Vitro," Neuron vol. 15, 1995, pp. 1053-1063.

International Search Report and Written Opinion—PCT/US2012/061167—ISA/EPO—Feb. 13, 2013.

Johnston, S.P., et al., "A Hybrid Learning Algorithm Fusing STDP with GA based Explicit Delay Learning for Spiking Neurone", Intelligent Systems, 2006 3rd International IEEE Conference on, IEEE, PI, Sep. 1, 2006, XP031078858, DOI: 10.1109/IS.2006.348493ISBN: 978-1-4244-0195-6, pp. 632-637.

Kubota et al', "Modulation of LTP/LTD balance in STDP by an activity-dependent feedback mechanism," Neural Network, vol. 22, 2009, pp. 527-535.

Maass, W. et al, "On the complexity of learning for spiking neurons with temporal coding", 1999.

Murakoshi, K. et al. "Firing Time of Neuron by Interference Between Synaptic Inputs," in International Conference on Systems, Man, and Cybernetics (SMC), 1999, pp. 377-382.

Natschlager, T. et al., "Spatial and temporal pattern analysis via spiking neurons", in Institute for Theoretical Computer Science, Technische Universitet Gratz, Austria, pp. 9(3): 319-32, 1998.

Paugam-Moisy, H., et al., "A supervised learning approach based on STDP and polychronization in spiking neuron networks", ESANN'2007 proceedings—European Symposium on Artificial Neural Networks, Apr. 1, 2007, pp. 25-27, XP055049375, Bruges, Belgium ISBN: 2930307072Retrieved from the Internet:URL:http://www.elen.ucl.ac.be/Proceedings/esann/esannpdf/es2007-95.pdf [retrieved on Jan. 11, 2013] p. 427-p. 432, line 4.

Ruf, B. et al.,"Hebbian learning in neworks of spikng neurons usng temporal coding", in Biological and artificial computation: From neuroscience to technology, pp. 380-389, 1997.

Schemmel J. et al., "Implementing Synaptic Plasticity in a VLSI Spiking Neural Network Model", International Joint Conference on Neural Networks, 2006. IJCNN '06, Piscataway, NJ: IEEE Operations Center, Piscataway, NJ, USA, Jan. 1, 2006, pp. 1-6, XP002557202. ISBN: 978-0-7803-9490-2 Retrieved from the Internet: URL:http://www.kip.uni-heidelberg.de/Veroeffentiichungen/downioad.cgi/4620/ps/1774.pdf [retrieved on Nov. 23, 2009].

Senn, et al., "An Algorithm for Synaptic Modification Based on Exact Timing of Pre- and Post-Synaptic Action Potentials," In Proceedings: ICANN, 1997, 6 pgs.

Standage, D., et al., "The Trouble with Weight-Dependent STDP", Neural Networks, 2007. IJCNN 2GG7. International Joint Conference on, IEEE, Piscataway, NJ, USA, Aug. 1, 2007, pp. 1348-1353, XP031154790, ISBN: 978-1-4244-1379-9.

Tanaka. H., et al., "A CMOS Spiking Neural Network Circuit with Symmetric/Asymmetric STDP Function", IEICE Transactions on Fundamentals of Electronics,Communications and Computer Sciences, Engineering Sciences Society, Tokyo, JP, vol. E92A, No. 7,

(56) References Cited

OTHER PUBLICATIONS

Jul. 1, 2009, pp. 1690-1698, XP001547503, ISSN: 0916-8508, DOI: 10.1587/TRANSFUN.E92.A.1690 p. 1690-p. 1696, right-hand column.
Brette et al.,"Simulation of networks of spiking neurons: A review of tools and strategies," Springer, Journal of Computational Neuroscience, vol. 23, pp. 349-398, 2007.
Hunzinger, J.V., et al., "Learning complex temporal patterns with resource-dependent spike timing-dependent plasticity", Journal of Neurophysiology, vol. 108, No. 2, Jul. 15, 2012, pp. 551-566, XP055069720, ISSN: 0022-3077, DOI:10.1152/jn.01150.2011 the whole document.
Nageswaran, J.M., et al., "A configurable simulation environment for the efficient simulation of large-scale spiking neural networks on graphics processors", Neural Networks, Elsevier Science Publishers, Barking, GB, vol. 22, No. 5-6, Jul. 1, 2009, pp. 791-800, XP026446158.
Park, H.O., et al., "Discrete Synapse Recurrent Neural Network for nonlinear system modeling and its application on seismic signal classification", Neural Networks (IJCNN), The 2010 International Joint Conference on, IEEE, Piscataway, NJ, USA, Jul. 18, 2010, pp. 1-7, XP031771705.
Schaik, A.V., et al., "A log-domain implementation of the Izhikevich neuron model", IEEE International Symposium on Circuits and Systems. ISCAS 2010—May 30-Jun. 2, 2010—Paris, France, IEEE, US, May 30, 2010, pp. 4253-4256, XP031724796, ISBN: 978-1-4244-5308-5 the whole document.
Eurich C W.,et al. "Dynamic of Self-Organized Delay Adaptation", Physical Review Letters, vol. 82, No. 7, Feb. 1999, pp. 1594-1597.
Gilson M., et al., "Emergence of Network Structure Due to Spike-Timing-Dependent Plasticity in Recurrent Neuronal Networks. I. Input Selectivity-Strengthening Correlated Input Pathways", Biological Cybernetics, Jun. 2009, pp. 81-102.
Bishop W.B., "Estimating the posterior probability of LTP failure by sequential Bayesian analysis of an imperfect Bernoulli trial model," IEEE Transactions on Biomedical Engineering, vol. 48, No. 6, Jun. 2001, pp. 670-683, XP011007084, DOI: 10.1109/10.923785 Section III.A.1.
Friedrich J., et al., "Dynamics of recurrent neural networks with delayed unreliable synapses: metastable clustering," Journal of Computational Neuroscience, vol. 27, No. 1, Dec. 10, 2008, pp. 65-80, XP019730519, DOI:10.1007/S10827-008-0127-1 Section 2.
Lubenov E.B., et al., "Decoupling through synchrony in neuronal circuits with propagation delays". Neuron, vol. 58, No. 1, Apr. 9, 2008, pp. 118-131, XP055101258, DOI:10.1016/j.neuron.2008.01.036 Experimental procedures.
Morrison A., et al., "Phenomenological models of synaptic plasticity based on spike timing," Biological Cybernetics, vol. 98, No. 6, Apr. 9, 2008, pp. 459-478, XP019630139, DOI: 10.1007/S00422-008-0233-1 Section 4.1.3.
Beerhold J R., et al., "Pulse-Processing Neural Net Hardware with Selectable Topology and Adaptive Weights and Delays," Neural Networks, IJCNN International Joint Conference on, Jun. 1990, pp. 569-574.
Lam J., et al., "Novel global robust stability criteria for interval neural networks with multiple time-varying delays" Physics Letters A 342. 4, 2005, pp. 322-330.
Liu X., et al., "Global exponential stability of generalized recurrent neural networks with discrete and distributed delays" Neural Networks 19.5, 2006, pp. 667-675.
Qu Y., et al., "Global robust stability of delayed recurrent neural networks" Chaos, Solitons & Fractals 23.1, 2005, pp. 221-229.
Schrauwen B., et al., "Extending SpikeProp," Neural Networks, 2004. Proceedings. 2004 IEEE International Joint Conference on , vol. 1, No., DOI: 10.1109/IJCNN.2004.1379954, Jul. 25-29, 2004, pp. 475.
Zidong., et al., "Exponential stability of uncertain stochastic neural networks with mixed time-delays" Chaos, Solitons & Fractals 32.1, 2007, pp. 62-72.

\* cited by examiner

METHOD AND APPARATUS FOR NEURAL LEARNING OF NATURAL MULTI-SPIKE TRAINS IN SPIKING NEURAL NETWORKS

BACKGROUND

1. Field

Certain aspects of the present disclosure generally relate to neural system engineering and, more particularly, to a method and apparatus for neural learning of natural multi-spike trains in spiking neural networks.

2. Background

The typical spike-timing-dependent plasticity (STDP) learning rule adapts a synaptic weight based on timing between a single pair of pre (input) spike and post (output) spike. However, natural spike trains (e.g., in biology) and spike trains in spiking neural networks do not generally have clearly separated pairs of spikes. Therefore, multiple input and output spikes represent the general case. Yet, learning based on the STDP may fail to converge due to oscillation of weight increases and decreases. Moreover, the basic STDP learning rule may fail to account for biologically observed learning in multi-spike contexts.

Two main models have been proposed in the literature based on theories. One method requires computation based on all combination pairs (pre-synaptic and post-synaptic). However, this approach is often computationally expensive. The other method explains rate-based effects, but not temporal effects that are relevant for temporal coding. Furthermore, this approach can be dependent on the neuron dynamics model and may require complex filtering on multiple timescales.

Therefore, a computationally practical method is desired that offers stability and fast learning for spiking networks operating in a temporal coding context, which can also be biologically plausible.

SUMMARY

Certain aspects of the present disclosure provide a method of neural learning. The method generally includes modulating an input from a pre-synaptic neuron to a post-synaptic neuron by a weight of a synapse connecting the pre-synaptic neuron and the post-synaptic neuron, and adapting the weight of synapse based on at least one of a resource associated with the synapse, a time since a last change of the weight, or spike timing of the pre-synaptic neuron and the post-synaptic neuron.

Certain aspects of the present disclosure provide an apparatus for neural learning. The apparatus generally includes a first circuit configured to modulate an input from a pre-synaptic neuron to a post-synaptic neuron by a weight of a synapse connecting the pre-synaptic neuron and the post-synaptic neuron, and a second circuit configured to adapt the weight of synapse based on at least one of a resource associated with the synapse, a time since a last change of the weight, or spike timing of the pre-synaptic neuron and the post-synaptic neuron.

Certain aspects of the present disclosure provide an apparatus for neural learning. The apparatus generally includes means for modulating an input from a pre-synaptic neuron to a post-synaptic neuron by a weight of a synapse connecting the pre-synaptic neuron and the post-synaptic neuron, and means for adapting the weight of synapse based on at least one of a resource associated with the synapse, a time since a last change of the weight, or spike timing of the pre-synaptic neuron and the post-synaptic neuron.

Certain aspects of the present disclosure provide a computer program product for neural learning. The computer program product generally includes a computer-readable medium comprising code for modulating an input from a pre-synaptic neuron to a post-synaptic neuron by a weight of a synapse connecting the pre-synaptic neuron and the post-synaptic neuron, and adapting the weight of synapse based on at least one of a resource associated with the synapse, a time since a last change of the weight, or spike timing of the pre-synaptic neuron and the post-synaptic neuron.

Certain aspects of the present disclosure provide a method of neural learning. The method generally includes modulating an input from a pre-synaptic neuron to a post-synaptic neuron by a weight of a synapse connecting the pre-synaptic neuron and the post-synaptic neuron, adapting the weight of synapse based on a resource consideration associated with the synapse and spike timing of the pre-synaptic neuron and the post-synaptic neuron, and determining the resource consideration based on one or more timing relations between prior spikes of the pre-synaptic and post-synaptic neurons.

Certain aspects of the present disclosure provide an apparatus for neural learning. The apparatus generally includes a first circuit configured to modulate an input from a pre-synaptic neuron to a post-synaptic neuron by a weight of a synapse connecting the pre-synaptic neuron and the post-synaptic neuron, a second circuit configured to adapt the weight of synapse based on a resource consideration associated with the synapse and spike timing of the pre-synaptic neuron and the post-synaptic neuron, and a third circuit configured to determine the resource consideration based on one or more timing relations between prior spikes of the pre-synaptic and post-synaptic neurons.

Certain aspects of the present disclosure provide an apparatus for neural learning. The apparatus generally includes means for modulating an input from a pre-synaptic neuron to a post-synaptic neuron by a weight of a synapse connecting the pre-synaptic neuron and the post-synaptic neuron, means for adapting the weight of synapse based on a resource consideration associated with the synapse and spike timing of the pre-synaptic neuron and the post-synaptic neuron, and means for determining the resource consideration based on one or more timing relations between prior spikes of the pre-synaptic and post-synaptic neurons.

Certain aspects of the present disclosure provide a computer program product for neural learning. The computer program product generally includes a computer-readable medium comprising code for modulating an input from a pre-synaptic neuron to a post-synaptic neuron by a weight of a synapse connecting the pre-synaptic neuron and the post-synaptic neuron, adapting the weight of synapse based on a resource consideration associated with the synapse and spike timing of the pre-synaptic neuron and the post-synaptic neuron, and determining the resource consideration based on one or more timing relations between prior spikes of the pre-synaptic and post-synaptic neurons.

Certain aspects of the present disclosure provide a method of neural learning. The method generally includes modulating an input from a pre-synaptic neuron to a post-synaptic neuron by a weight of a synapse connecting the pre-synaptic neuron and the post-synaptic neuron, adapting the weight of synapse based on a resource consideration associated with the synapse and spike timing of the pre-synaptic neuron and the post-synaptic neuron, and determining the resource consideration based on an amount of time since a prior commitment to a change of the weight.

Certain aspects of the present disclosure provide an apparatus for neural learning. The apparatus generally includes a first circuit configured to modulate an input from a pre-synaptic neuron to a post-synaptic neuron by a weight of a synapse connecting the pre-synaptic neuron and the post-synaptic neuron, a second circuit configured to adapt the weight of synapse based on a resource consideration associated with the synapse and spike timing of the pre-synaptic neuron and the post-synaptic neuron, and a third circuit configured to determine the resource consideration based on an amount of time since a prior commitment to a change of the weight.

Certain aspects of the present disclosure provide an apparatus for neural learning. The apparatus generally includes means for modulating an input from a pre-synaptic neuron to a post-synaptic neuron by a weight of a synapse connecting the pre-synaptic neuron and the post-synaptic neuron, means for adapting the weight of synapse based on a resource consideration associated with the synapse and spike timing of the pre-synaptic neuron and the post-synaptic neuron, and means for determining the resource consideration based on an amount of time since a prior commitment to a change of the weight.

Certain aspects of the present disclosure provide a computer program product for neural learning. The computer program product generally includes a computer-readable medium comprising code for modulating an input from a pre-synaptic neuron to a post-synaptic neuron by a weight of a synapse connecting the pre-synaptic neuron and the post-synaptic neuron, adapting the weight of synapse based on a resource consideration associated with the synapse and spike timing of the pre-synaptic neuron and the post-synaptic neuron, and determining the resource consideration based on an amount of time since a prior commitment to a change of the weight.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
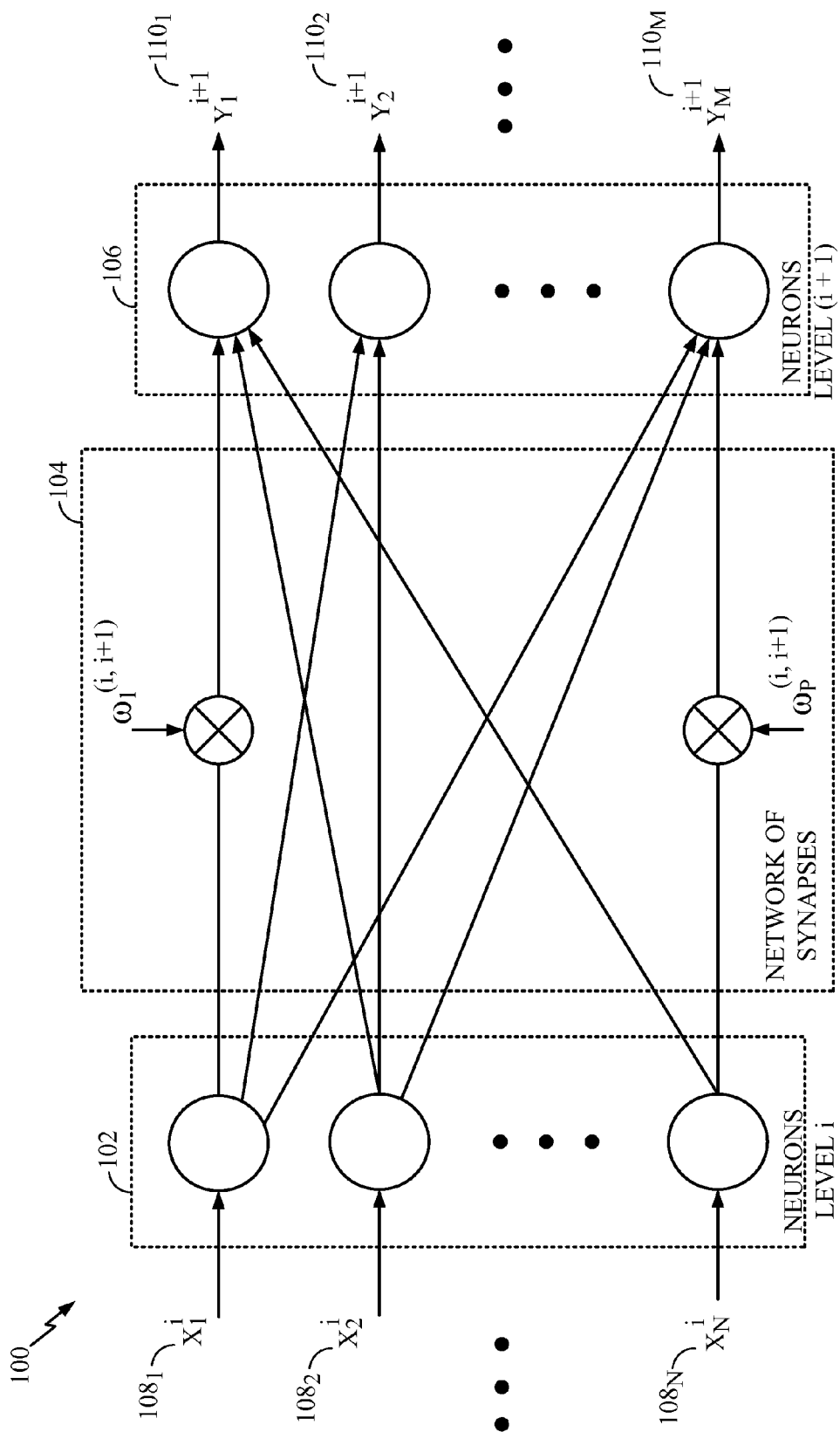
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Learning in spiking neural networks, such as the neural network 100 from FIG. 1, may typically employ a spike-timing-dependent plasticity (STDP) rule based on biologically observed data. Such typical learning may adapt weights of synapses (e.g., the weights of synapses 104 from FIG. 1) based on a time difference between the pre-synaptic neuron input spike and the post-synaptic neuron spike. However, more natural spike trains (e.g., occurring in biology or engineering networks) may comprise multiple spikes (both pre-synaptic and post-synaptic). When there are multiple pre-synaptic and post-synaptic spikes as in natural spike trains, learning according to the STDP rule can be unstable and fail to converge because weight adjustments may merely average out or oscillate due to sensitivity of whether long-term potentiation (LTP) or long-term depression (LTD) may dominate depending on precise times. Another problem that may arise is over-firing or under-firing of neurons. This may be an issue whether the pair-wise STDP rule is applied to all combinations of pairs of spikes, or to sequences of adjacent pairs of spikes.

Certain aspects of the present disclosure support an engineering solution based on a resource concept to stabilize and accelerate multi-spike learning. Recently, new biological evidence has been found contrary to the typical STDP rule. Certain theories and models have been proposed to explain multi-spike or spike-rate phenomenons. However, these models are complex requiring maintaining histories of prior spike times, computing multiple filters, and having large number of parameters to which performance is sensitive. In addition, these models are not independent computationally from other aspects of an engineered spiking neural network. The resource-based method proposed in the present disclosure is computationally simpler, largely separable, and outperforms the other methods.

Learning of Multi-Spike Trains Based on Spike-Timing-Dependent Plasticity Rule

The STDP learning rule may effectively adapt a synaptic weight of a synapse connecting a neuron A to a neuron B as a function of time difference between the pre-synaptic neuron A's spike time $t_{pre}$ and post-synaptic neuron B's spike time $t_{post}$ (i.e., $\Delta t = t_{post} - t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron). A change of the synaptic weight may be typically achieved using an exponential decay, as given by:

$$\Delta w = A_{sign(\Delta t)} \cdot e^{-|\Delta t|/\tau_{sign(\Delta t)}}, \quad (1)$$

where $\tau_{sign(\Delta t)}$ is a time constant and $A_{sign(\Delta t)}$ is a scaling magnitude, wherein both $\tau_{sign(\Delta t)}$ and $A_{sign(\Delta t)}$ may typically depend on whether the time difference is positive or negative.

The STDP learning rule is clear if there is one pre-synaptic spike and one post-synaptic spike. On the other hand, the STDP learning rule is not clear if there are multiple spikes, because it is not clear which time should be used. One simple engineering solution can be to use the latest (most recent) times for spikes. In other words, instead of considering all pair combinations, only sequential pairs of spikes are considered. However, there are at least two problems with this approach.

First, using the latest spike time with the typical STDP rule can be insufficient to ensure stable learning. For example, a spike of the pre-synaptic neuron A may be followed by a spike of the post-synaptic neuron B followed by another spike of the pre-synaptic neuron A (a pre-post-pre triplet). Now, the question is should the weight of synapse connecting the neuron A to the neuron B be increased or decreased. According to the STDP rule, the weight would be first increased and then decreased. The overall change would be based on the timing of the independent pairs of the first pre-synaptic spike and the post-synaptic spike, and the second pre-synaptic spike and the post-synaptic spike. However, it is clear that the weight changes conflict each other. The situation may become worse with more spikes, and if the weight update is not performed immediately but rather accumulated.

Second, using the latest spike time with the typical STDP learning rule does not predict the biologically observed learning effects in natural multi-spike trains. Rather, the STDP rule may often predict the completely opposite learning effect (e.g., increase in synaptic weight rather than decrease). Certain theories and methods have been proposed in the literature to explain and model such observed multi-spike trains. However, there are several problems with these prior methods.

One proposed method may require computation based on all combination pairs (pre-synaptic and post-synaptic). This approach can be problematic for several reasons. First, weight adaptation is a function of timing of all spikes. Therefore, an engineering of neural network may require keeping track of a history of pre-synaptic and post-synaptic spikes to be able to compute weight adaptation based on considering all possible pairs of spikes that occurred. This can be computationally very onerous because it may require considering: (i) the time difference between successive spikes of each neuron n at times $t_{n,i}$ and $t_{n,i-1}$ in order to compute an efficacy for each spike i, $$\epsilon_{n,i} = 1 - e^{-(t_{n,j}-t_{n,j-1})/\tau_e}, \quad (2)$$

where $\tau_e$ is a time constant depending on whether the neuron is pre-synaptic or post-synaptic, and (ii) each combination of pairs of pre-synaptic and post-synaptic spikes occurring in the past because the weight change is given by, $$\Delta w_{m,n} = \sum_j \sum_i \epsilon_{n,j} \epsilon_{m,i} A_{sign(\Delta t)} e^{-|\Delta t|/\tau_{sign(\Delta t)}}, \quad (3)$$

where n represents the post-synaptic neuron, m represents the pre-synaptic neuron, and i and j are indices of all the prior spikes of that corresponding neuron. Clearly, this may become more and more onerous (in terms of both memory and computation) for multi-spike trains with more spikes.

Second, this method can be sensitive to the time constant parameters for the efficacy filters in terms of accurate and precise predicting of biologically observed data. For example, one setting may predict spike triplets better while resulting in a worse prediction of learning of spike quadruplets. Third, the learning may not be entirely separable from the spiking behavior because of the dependence on the efficacy variables.

The other proposed method predicting neural activity with simple neural models of the threshold type (adaptive exponential integrate-and-fire model with two compartments) may explain rate-based effects. However, this method can be also problematic for several reasons. First, weight adaptation can be based on multiple filters including a synaptic trace filter (of synaptic input $x_m(t)$ from a pre-synaptic neuron m) and two separate filters of membrane potential $u_n(t)$ of a post-synaptic neuron n. These filters take the form of differential equations. For example, one of the post-synaptic membrane potential filters may be described as:

$$\tau_+ \frac{d\bar{u}_+(t)}{dt} = -\bar{u}_+(t) + u(t). \quad (4)$$

All these filters (one per synapse and two per neuron) are in addition to the model of the neuron itself. The filters can be generally defined in terms of time constants (i.e., one for the pre-synaptic and two for the post-synaptic neuron) and thresholds (one for weight increase and one for weight decrease). Second, this is clearly complicated as the thresholds and time constants may depend on the neuron model being used since they are functions of the neuron membrane potential and not of the spiking (for example, whether a leaky integrate-and-fire neuron model is used or Izhikevich simple neuron model, or otherwise). For example, in this approach, the neuron model can be quite complicated, i.e., the adaptive exponential integrate-and-fire model, given by:

$$C \frac{du(t)}{dt} = -g_L(u - E_L) + g_L \Delta_T e^{(u-V_T)/\Delta_T} - w_{ad} + z + I, \quad (5)$$

where C is a membrane capacitance, $g_L$ is a leak conductance, $E_L$ is a resting potential, $\Delta_T$ is a slope factor, and $V_T$ is a threshold potential. In other words, if the neuron dynamics are changed, the thresholds and time constants may have to be changed.

Third, while this method may predict some biologically observed learning as a function of spiking rates, the method does not reliably predict spike timing dependent learning, such as for a cortex. An easy way to observe this is that no learning will occur in the model defined by equation (5) unless there has been a recent post-synaptic activity (prior to a pre-synaptic-post-synaptic pair) because of the rectified term $(\bar{u}_+(t) - \theta_-)_+$ in the weight adaptation formulation, $$\frac{dw_{m,n}}{dt} = A_+ \bar{x}_m(t)(u(t) - \theta_+)_+ (\bar{u}_+(t) - \theta_-)_+ + A_- X_m(t)\bar{\bar{u}}(t)(\bar{u}_-(t) - \theta_-)_+. \quad (6)$$

Fourth, the weight adaptation rule may not be separable from the neuron dynamics. Fifth, the memory and computational resources may be required for all the filters and variables.

A method proposed in the present disclosure solves the aforementioned problems by adapting a synaptic weight depending on a learning resource associated with the synapse, which may be depleted by weight change and recovers over time. In the preferred embodiment of the present disclosure, the weight adaptation may be dependent only on the time since the last significant weight change. Hence, this method may be separable and may require no spike trace memory, and can even reduce the frequency of weight changes.

The method proposed in the present disclosure may provide multiple advantages over other methods. First, it may result in stable and fast learning in multi-spike train contexts as well as in single spike contexts, and may accurately and precisely predict biologically observed learning effects in single and multi-spike contexts. Second, the proposed method has very low complexity. Learning or adaptation may depend only on one variable, and thus it may not require history, filtering, or other complex operations. Third, the proposed method may be computationally separable from other neuron operations. The weight adaptation may depend on aspects of the last adaptation, and not of the spike history or neuron dynamics. It may also be independent of the neuron model (whether integrate and fire, leaking integrate and fire, Izhikevich simple model, or any other spiking model). Fourth, the proposed method may reduce the computational complexity even relative to the typical sequential pair-wise STDP. This may be because, in the preferred embodiment, weight adaptation may actually be avoided depending on the prior adaptations. Therefore, an engineering of neural network may operate faster by having fewer weight changes, and yet have better performance. All of these advantages will be explained and demonstrated in the present disclosure.

Novel Method for Multi-Spike Neural Learning

Certain aspects of the present disclosure provide adapting a synaptic weight depending on available learning resources and spike timing. In an aspect, learning resources may be depleted by synaptic modifications, and may be recovered over time. The amount of synaptic modification may be limited by the amount of learning resources available. According to certain aspects of the present disclosure, the learning resources may be modeled as a single quantity available for a particular neuron or compartment or synapse. In the preferred aspect of the present disclosure, the resources may be per-synapse per-neuron.

In an exemplary case, each neuron n may be a spiking leaky integrate and fire neuron with a membrane voltage $v_n(t)$ governed by, for example, the following dynamics, $$\frac{dv_n(t)}{dt} = \alpha v_n(t) + \beta \sum_m w_{m,n} y_m(t - \Delta t_{m,n}),\qquad(7)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

In an aspect of the present disclosure, the adaptation of synaptic weight for a synapse connecting the pre-synaptic neuron m to a post-synaptic neuron n may be given by:

$$\Delta w_{m,n} = r_{m,n} A_{sign(\Delta t)} e^{-|\Delta t|/\tau_{sign(\Delta t)}},\qquad(8)$$

or after dropping the indices, $$\Delta w = r A_{sign(\Delta t)} e^{-|\Delta t|/\tau_{sign(\Delta t)}},\qquad(9)$$

where $\Delta t$ is the time difference between a post-synaptic spike and a pre-synaptic spike, and r (or $r_{m,n}$) represents available resources.

In an aspect, if all resources are available, $r_{m,n}=1$. On the other hand, if no resources are available, $r_{m,n}=0$. It should be noted that if no resources are available, it may not be required to even compute time difference, sign or exponent. For example, for each of these, the latest values may be used, or $\Delta t = t_n^{latest} - t_m^{latest}$. It is proposed in the present disclosure that the weight adaptation has an associated resource time $t_r$ (whether or not that is the actual time of the weight change or any other operation) representing the time at which commitment to a synaptic change is made. In an aspect, the resource time may be determined based on the pre-synaptic spike time or the post-synaptic spike time, whichever is later, i.e., $$t_r = \max(t_n, t_m).\qquad(10)$$

In a preferred aspect of the present disclosure, the time defined by equation (10) may be the effective time of weight adaptation (if there is a weight change). In other words, a change in weight may be triggered either upon a post-synaptic firing (after a pre-synaptic firing) or upon a pre-synaptic firing (after a post-synaptic firing).

According to certain aspects, when a weight change occurs, resources may be used up. When the next weight adaptation is being considered, the amount of available resources may be first determined. In one aspect, the amount of available resources may be computed according to:

$$r = 1 - r^{used} \cdot e^{-(t_r - t_r^{last})/\tau_r},\qquad(11)$$

where the neuron subscripts for the resources r have been omitted to improve clarity. In an aspect, if this is done at the time of potential weight adaptation, $t_r = t$ (the current time) and $t_r^{last}$ is the time of the prior (last) resource usage (weight adaptation).

Since resources may have been depleted previously, more general model for the resource recovery may be given as:

$$r(t) = 1 - (1 - r(t_r^{last})) \cdot e^{-(t - t_r^{last})/\tau_r}.\qquad(12)$$

Alternatively, the resource recovery may be modeled in discrete time. In an aspect of the present disclosure, the resource variable r may be recovered using a step-wise Infinite Impulse Response (IIR) filter, as given by:

$$r = 1 - c(1 - r),\qquad(13)$$

where the coefficient c may be a value smaller than one depending on the desired time constant. Equivalently, the lack of resource r' may be modeled instead of the availability of resource r, where $r = 1 - r'$. Therefore, equation (12) can be simplified to:

$$r' = cr',\qquad(14)$$

where the resource variable r should then be replaced by the variable (1−r') in equation (9) defining the weight adaptation.

Effectively, the resources used previously ($r^{last}$) may be recovered with time constant $\tau_r$, up to the maximum (e.g., to the value of one, without loss of generality). In an aspect, the resources used upon a weight change may be expressed as a function of weight change:

$$r^{used} = f(\Delta w)\qquad(15)$$

An example of the function of weight change can be to utilize weights in the range [0,1], and use an absolute value of the weight change as the resources used up or, $r^{used} = |\Delta w|$. In addition, a scaling factor may be applied, $r^{used} = A_u |\Delta w|$.

Figure 2:
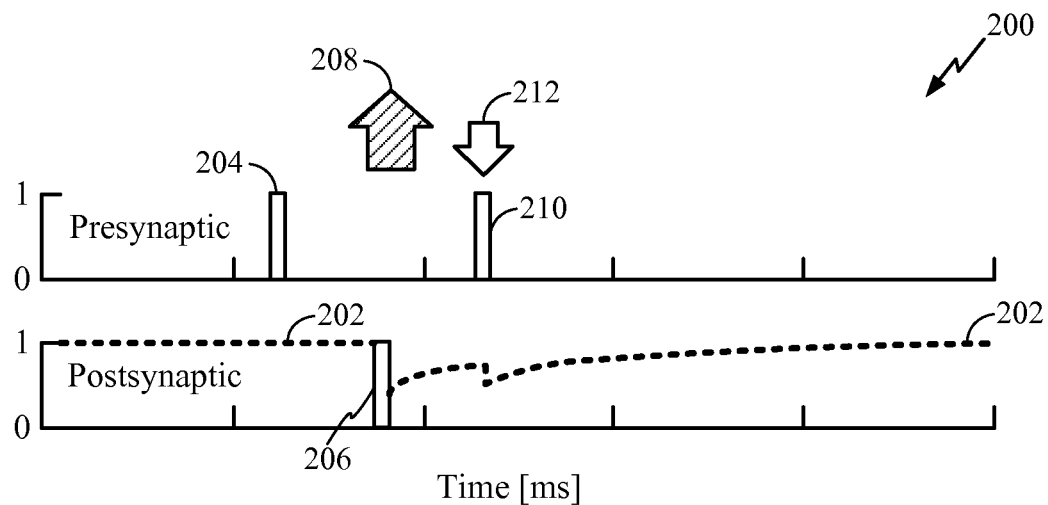
FIG. 2 illustrates an example of pre-synaptic and post-synaptic neuron spiking and synapse weight adaptation in accordance with certain aspects of the present disclosure.

FIG. 2 illustrates an example 200 of pre-synaptic and post-synaptic neuron spiking and synapse weight adaptation in accordance with certain aspects of the present disclosure. A trace 202 in FIG. 2 depicts the amount of resources available. Initially, there has been no prior activity, so the available resources at the post-synaptic neuron are one (maximum). When a post-synaptic spike 206 follows a pre-synaptic spike 204, the synaptic weight may be increased by a large amount (signified by an arrow 208 in FIG. 2) due to their relative proximity. This large modification may use up a significant amount of resources in order to change the weight. The resources 202 may slowly be replenished (recovered), but may still not be fully recovered by the time of second pre-synaptic spike 210. Thus, the depression of weight may be limited despite the pre-synaptic spike 210 being proximate from the post-synaptic spike 206, as illustrated by a small arrow 212 in FIG. 2. The depression of weight 212 may use up a small amount of resources, as indicated by the coinciding dip in the resource trace 202.

Figure 3:
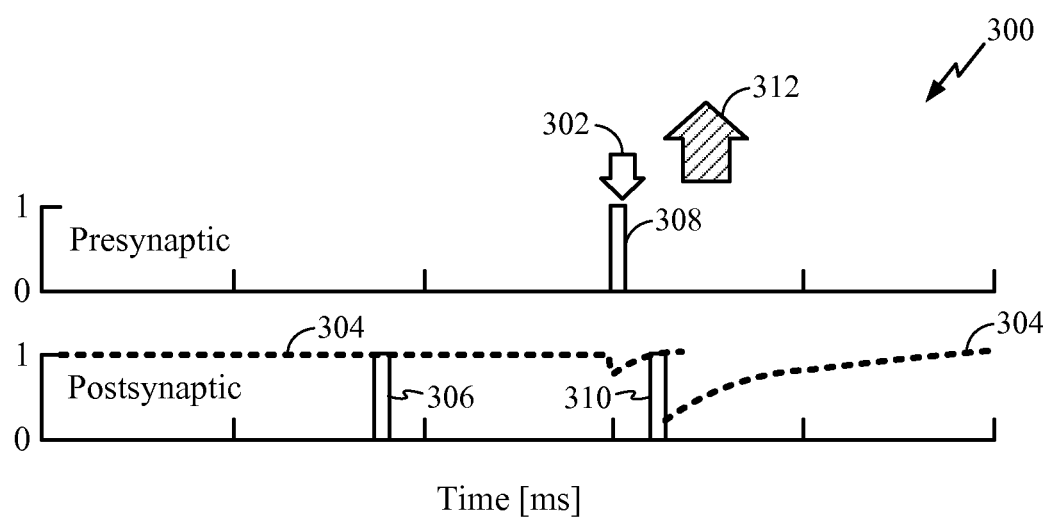
FIG. 3 illustrates another example of pre-synaptic and post-synaptic neuron spiking and synapse weight adaptation in accordance with certain aspects of the present disclosure.

FIG. 3 illustrates an example 300 of pre-synaptic and post-synaptic neuron spiking and synapse weight adaptation in accordance with certain aspects of the present disclosure. In this case, the first weight change 302 (a depression due to post-pre timing) is not limited by resources (illustrated by a trace 304), but may be small because of the large time difference between spikes 306 and 308. Thus, only a small amount of resources may be used up, and resources may recover almost entirely by the time of the next post-synaptic spike 310. Thus, the large weight change 312 (due to proximity of the spikes 308 and 310) can be fully managed. As illustrated in FIG. 3, that weight increase 312 may accordingly use up a lot of resources represented by the trace 304.

Some advantages of the proposed method can now be observed. First, the method may be computationally non-burdensome. Second, the proposed method may only require knowledge of the resources available, which may only be a function of time since the last resource usage, not of when prior spikes occurred. Third, the proposed method may efficiently work with any spiking neuron model. Although demonstrated with a leaky-integrate and fire neuron model, the proposed method has no dependence on this but rather only on the adaptation timing. Moreover, this method may not even depend on the weight change rule (whether exponential as illustrated in FIGS. 2-3, or other). It may only be required to modulate or constrain the weight change by the resources available and account for resource usage. It should be also noted that the proposed method may work regardless of whether multiple weight changes are multiplicative $(1+\Delta w=(1+\Delta w_1)\cdot(1+\Delta w_2)\ldots)$ or additive $(\Delta w=\Delta w_1+\Delta w_2+\ldots)$.

Further advantages of the proposed method may be obtained in the preferred embodiment. In particular, computations may be reduced. Instead of changing weights upon every potential event (pre-post or post-pre), a threshold may be applied to weight changes. Namely, a weight change may not be made unless there is a sufficient threshold of resources available, i.e., $$\Delta w = (r > \theta_r) A_{sign(\Delta t)} e^{-|\Delta t|/\tau_{sign(\Delta t)}}, \quad (16)$$

where $r_{m,n} > \theta_r$ is a logical expression yielding 0 or 1, and $\theta_r$ is a first resource threshold. If resources are below the threshold, computation of weight change may not be required. This may save computation and memory lookup for time differences.

Further, resource usage may be conditioned depending on a minimum weight change, i.e., $$r^{used} = f(\Delta w_{m,n}) \text{ if } \Delta w_{m,n} > \theta_w, \text{ else } r^{used} = 0, \quad (17)$$

where $\theta_w$ is a threshold of minimum change. For example, $f(\Delta w_{m,n})=1$ may be used to render this operation independent of the amount of weight change. In this formulation, either resources are fully used or not used at all (i.e., $r^{used}=1$ or 0).

It can be observed that it may not be required keeping track of resources $r$, but of the time of the last non-zero resource usage $t_r^{last}$ because the weight change consideration may be given by:

$$r = 1 - e^{-(t_r - t_r^{last})/\tau_r}, \quad (18)$$

$$\Delta w = (r > \theta_r) A_{sign(\Delta t)} e^{-|\Delta t|/\tau_{sign(\Delta t)}}. \quad (19)$$

Given the value for $\tau_r$, equation (18) can be solved for $\Delta t_r = t - t_r^{last}$ in, $$1 - e^{-(\Delta t_r)/\tau_r} = \theta_r. \quad (20)$$

Obtaining parameter $\Delta t_r$ may be given by, $$\Delta t_r = -\tau_r \log(1-\theta_r). \quad (21)$$

Therefore, the weight change defined by equation (19) may be given by:

$$\Delta w = (t - t_r^{last} > \Delta t_r) A_{sign(\Delta t)} e^{-|\Delta t|/\tau_{sign(\Delta t)}}. \quad (22)$$

According to equation (22), if the time since last resource usage is larger than $\Delta t_r$, then a weight adaptation may be considered by computing the remainder of equation (22). Further, if the absolute value of the weight change is above $\theta_w$, set $t_r^{last}=t$. Otherwise, either leave $t_r^{last}$ unchanged or set $t_r^{last}=-\infty$.

Figure 4:
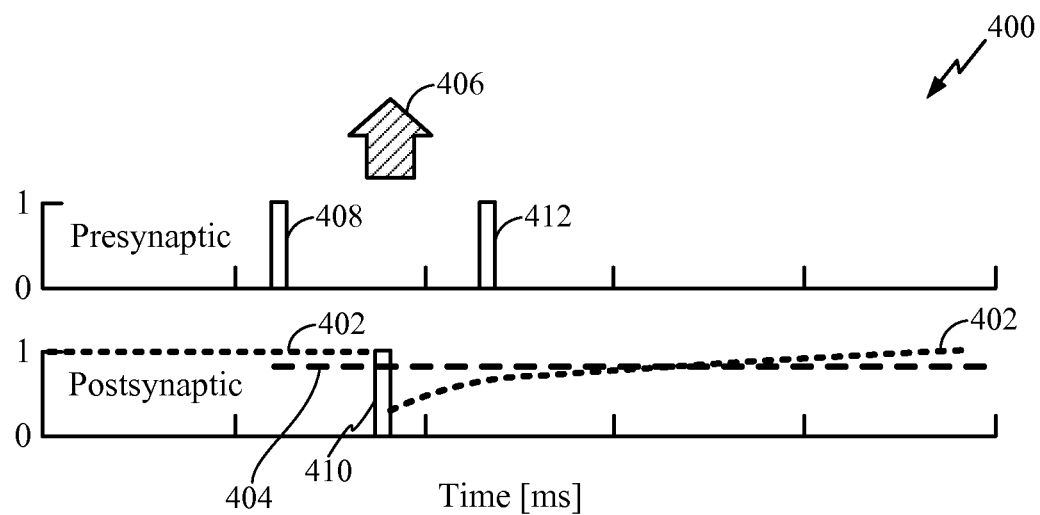
FIG. 4 illustrates another example of pre-synaptic and post-synaptic neuron spiking and synapse weight adaptation in accordance with certain aspects of the present disclosure.

FIG. 4 illustrates an example 400 of pre-synaptic and post-synaptic neuron spiking and synapse weight adaptation in accordance with certain aspects of the present disclosure. In this example, the available resources are indicated by a trace 402, but may not need to be modeled because $t_r^{last}$ may be used instead. A line 404 in FIG. 4 indicates the resource threshold $\theta_r$. Again, this threshold may not be required since $\Delta t_r$ may be utilized instead. The first weight change 406 is above the threshold given the proximity of spikes 408 and 410. As illustrated in FIG. 4, the resources 402 may then become zero and/or the time of weight change may be recorded as $t_r^{last}$. By the time of the second pre-synaptic spike 412, $\Delta t_r$ has not passed and/or the resources 402 have not recovered to a point above the threshold 404. Thus, in this case, no weight change may be computed or made.

Figure 5:
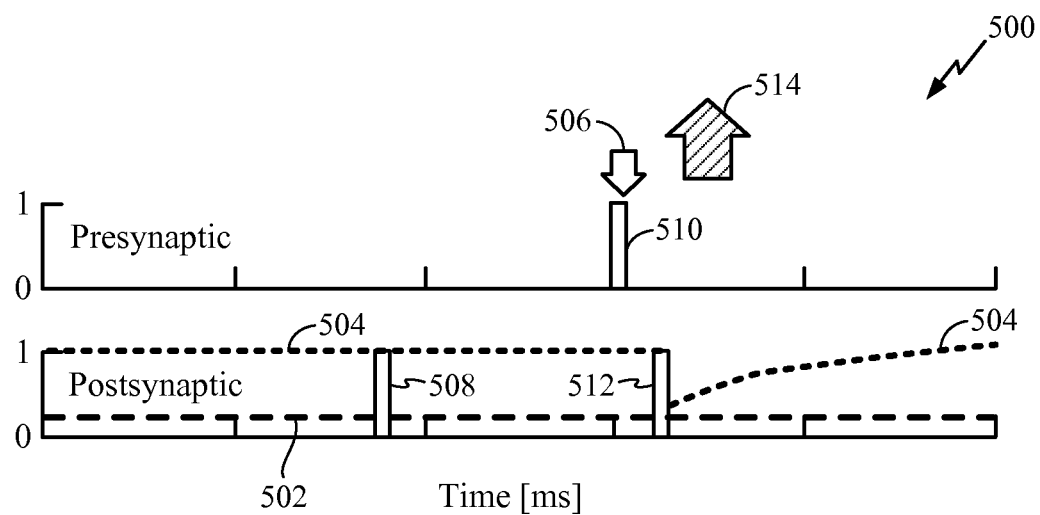
FIG. 5 illustrates another example of pre-synaptic and post-synaptic neuron spiking and synapse weight adaptation in accordance with certain aspects of the present disclosure.

FIG. 5 illustrates an example 500 of pre-synaptic and post-synaptic neuron spiking and synapse weight adaptation in accordance with certain aspects of the present disclosure. A line 502 in FIG. 5 depicts the weight change threshold (not the resource threshold), and a trace 504 indicates available resources over time. Since the first weight change 506 (depression) is small (due to time separation of spikes 508 and 510), a resource usage may not need to be recorded and/or $t_r^{last}$ may not need to be reset. Thus, when the second post-synaptic spike 512 occurs, the full potentiating weight change 514 may occur, and the resource usage may be recorded (as illustrated by the trace 504 in FIG. 5).

The method of synapse weight adaptation proposed in the present disclosure, may provide stable and fast learning, and may also predict biological learning since resources may be required to change synaptic weights. It has been theorized in the literature that long-term potentiation (LTP, weight increase) and long-term depression (LTD, weight decrease) are independent processes. However, the triggering mechanisms, if both based on $Ca^{2+}$ dynamics, may not be independent and thus the LTP and LTD may be related. In other words, the trigger mechanism for weight change may be common and make use of a single resource model biologically realistic. Nevertheless, it may not be necessary to use only one resource in the method.

The method proposed in the present disclosure may be extended to utilize two or more resources and assign each of these to a particular weight adaptation operation. For example, one resource may be used for LTP (long-term weight increases) and another resource may be used for LTD (long term weight decreases). Alternatively, one resource may be used for longer term changes and one resource may be used for short term changes, or combinations thereof. For example, $$r(j) = 1 - r_{used}(j) e^{-(t - t_r^{last}(j))/\tau_r(j)}, \quad (23)$$

where $j$ is the particular resource type index.

Alternatively, the same resource may be used for one or more types of weight change but with different parameter $\tau_r(i)$ depending on the type of modification that occurred at $t_r^{last}$, i.e., $$r(j) = 1 - r_{used} e^{-(t - t_r^{last})/\tau_r(j)}. \quad (24)$$

According to certain aspects, the resource model may also work well if the resources are computed after the weight change rather than before. This may be particularly effective if the resource time constant is set much shorter than with the preferred embodiment defined by equation (22). Various other variations are possible, such as combinations of the aforementioned modifications, quantization, and reordering of operations.

Figure 6:
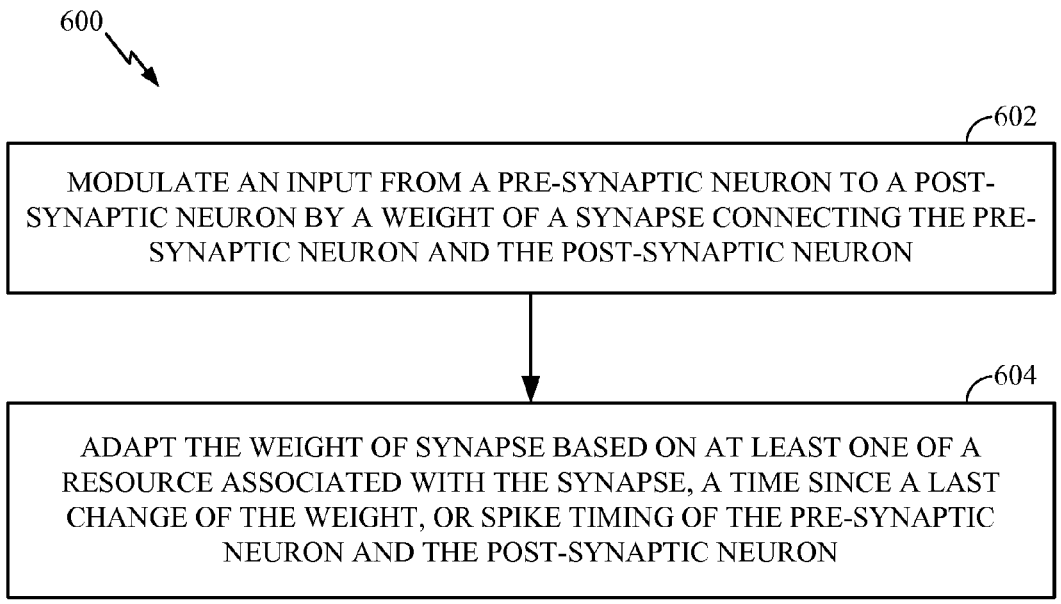
FIG. 6 illustrates example operations of neural learning in accordance with certain aspects of the present disclosure.

FIG. 6 illustrates example operations 600 of neural learning in accordance with certain aspects of the present disclosure. At 602, an input from a pre-synaptic neuron to a post-synaptic neuron may be modulated by a weight of a synapse connecting the pre-synaptic neuron and the post-synaptic neuron. At 604, the weight of synapse may be adapted based on at least one of a resource associated with the synapse, a time since a last change of the weight, or spike timing of the pre-synaptic neuron and the post-synaptic neuron.

According to certain aspects of the present disclosure, the resource may be modified in relation to adapting the weight of synapse. Further, the resource may be recovered over time towards a value of the resource before the modification. In one aspect, modifying the resource may comprise decreasing the resource. For example, the resource may be decreased by an amount proportional to an absolute value of a change in the weight of synapse during the adaptation. In addition, the resource may be decreased to zero, if an absolute value of a change in the weight of synapse during the adaptation is above a threshold.

In an aspect, a change in the weight of synapse during the adaptation may not be applied, if the resource is below a threshold. In another aspect, a change in the weight of synapse during the adaptation may not be applied, if the time since the last change is below a threshold. Further, recovering the resource over time may comprise recovering, after a time delay, the resource to the value before the modification of resource.

In an aspect, modifying the resource may occur when committing to adapting the weight. In another aspect, modifying the resource may occur when determining an aspect of adapting the weight, and adapting the weight may occur at a later time. For example, the aspect of adapting the weight may comprise at least one of an amount of a change in the weight, or a direction of a change in the weight.

According to certain aspects of the present disclosure, adapting the weight of synapse may further comprise: updating the weight of synapse effective at a time of spiking of the post-synaptic neuron or the pre-synaptic neuron, storing, at a time of the weight update, a time of updating the weight as a last time the resource was used, computing the resource at another time of updating the weight as a function of the other time and the last time the resource was used, and obtaining a change in the weight of synapse as a function of the computed resource. In one aspect, a value of the last time the resource was used may not be overwritten, if a magnitude of the change in the weight of synapse is below a threshold. Further, the change in the weight may be zero, if a value of the other time minus the last time the resource was used is smaller than a threshold.

In an aspect of the present disclosure, weight changes may be made later than when weight changes are triggered. For example, the weight changes may be triggered at pre-synaptic or post-synaptic events, and associated resources may be committed (accounted for) at that time or later depending on the amount of weight change that will occur in the future. The actual weight of the synapse may then be modified at a later time (separately). The weight changes may even be accumulated and applied together or applied slowly over longer time. It should thus be understood that actual weight change and resource modeling may be separated in time.

In an aspect of the present disclosure, the resource may be modeled by an equivalent function of a plurality of relative timings between prior pairings of pre-synaptic and post-synaptic spikes and the relative timing between those pairs. In other words, adapting the weight of synapse may be based on a resource consideration associated with the synapse and spike timing of the pre-synaptic neuron and the post-synaptic neuron, wherein that resource consideration may be determined based on a plurality of timing relations between pre-synaptic and post-synaptic neuron spikes and the timing relations among the plurality.

Figure 7:
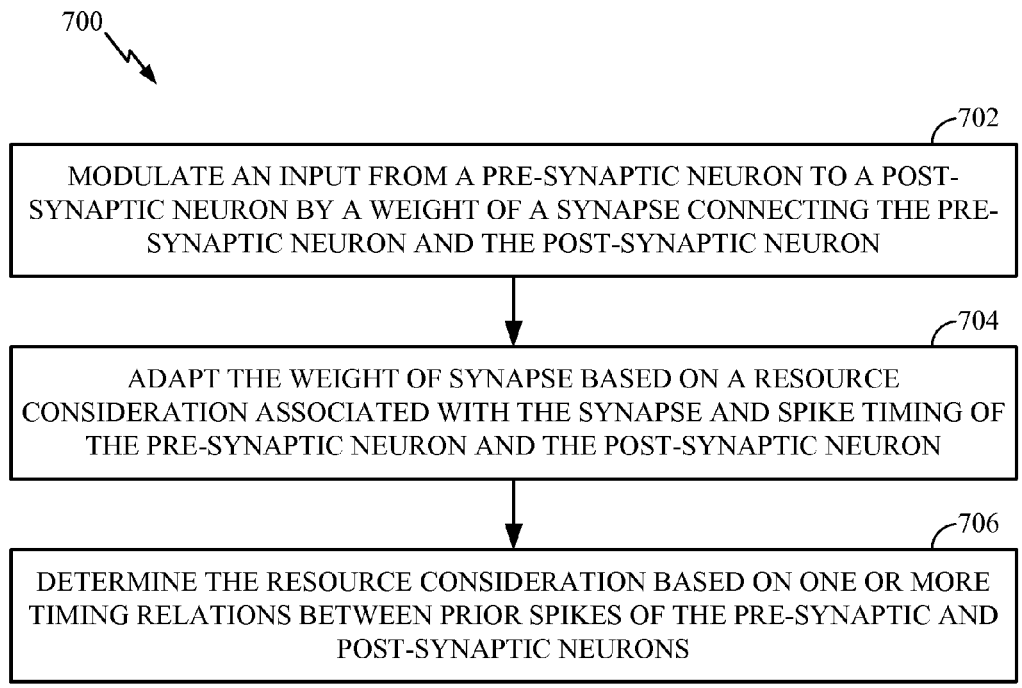
FIG. 7 illustrates other example operations of neural learning in accordance with certain aspects of the present disclosure.

FIG. 7 illustrates example operations 700 of neural learning in accordance with certain aspects of the present disclosure. At 702, an input from a pre-synaptic neuron to a post-synaptic neuron may be modulated by a weight of a synapse connecting the pre-synaptic neuron and the post-synaptic neuron. At 704, the weight of synapse may be adapted based on a resource consideration associated with the synapse and spike timing of the pre-synaptic neuron and the post-synaptic neuron. At 706, the resource consideration may be determined based on one or more timing relations between prior spikes of the pre-synaptic and post-synaptic neurons.

In an aspect of the present disclosure, the one or more timing relations may comprise information about a time difference between a pair of the prior spikes of the pre-synaptic and post-synaptic neurons. In another aspect, the one or more timing relations may comprise information about a time difference between a pair of the prior spikes and another pair of the prior spikes. In yet another aspect, the one or more timing relations comprise information about a time since a pair of the prior spikes occurred.

Figure 8:
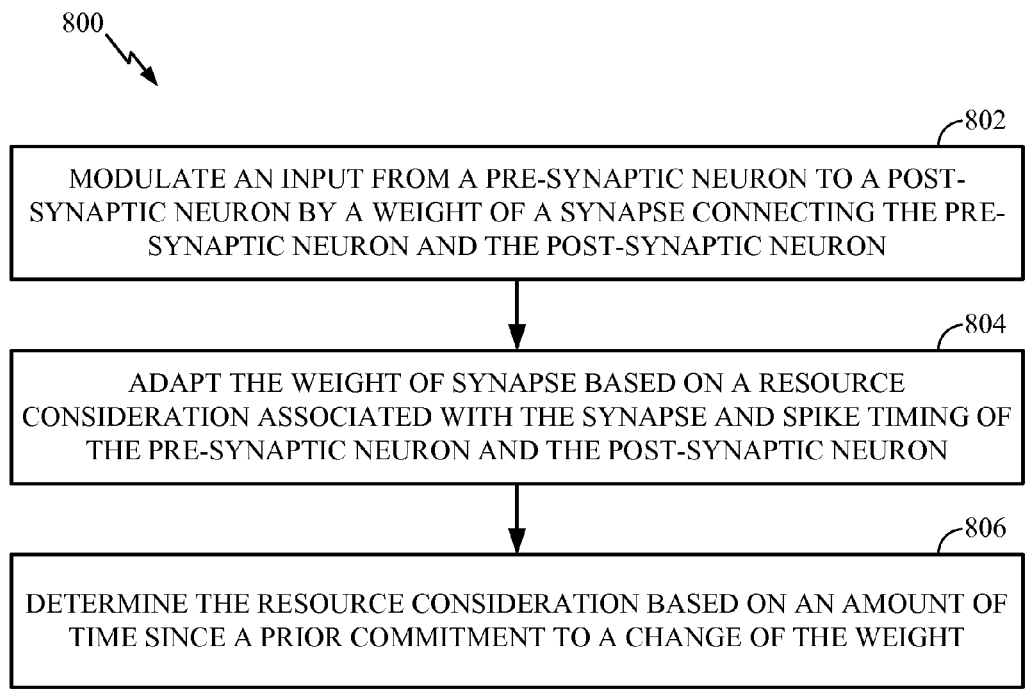
FIG. 8 illustrates other example operations of neural learning in accordance with certain aspects of the present disclosure.

FIG. 8 illustrates example operations 800 of neural learning in accordance with certain aspects of the present disclosure. At 802, an input from a pre-synaptic neuron to a post-synaptic neuron may be modulated by a weight of a synapse connecting the pre-synaptic neuron and the post-synaptic neuron. At 804, the weight of synapse may be adapted based on a resource consideration associated with the synapse and spike timing of the pre-synaptic neuron and the post-synaptic neuron. At 806, the resource consideration may be determined based on an amount of time since a prior commitment to a change of the weight. In an aspect of the present disclosure, the change of weight may occur a time after committing to the change of weight.

Figure 9:
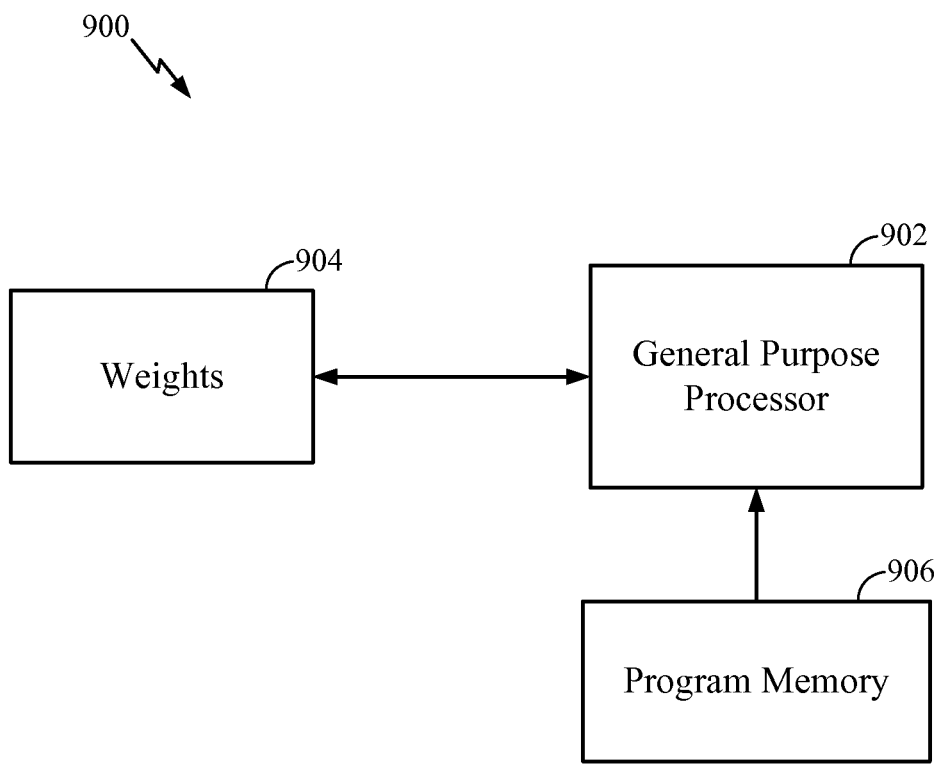
FIG. 9 illustrates an example software implementation of neural learning using a general-purpose processor in accordance with certain aspects of the present disclosure.

FIG. 9 illustrates an example software implementation 900 of the aforementioned method for neural learning using a general-purpose processor 902 in accordance with certain aspects of the present disclosure. Weights associated with each connection (synapse) of a computational network (neural network) may be stored in a memory block 904, while instructions related to the neural learning being executed at the general-purpose processor 902 may be loaded from a program memory 906. In an aspect of the present disclosure, the instructions loaded into the general-purpose processor 902 may comprise code for modulating an input from a pre-synaptic neuron to a post-synaptic neuron by a weight of a synapse connecting the pre-synaptic neuron and the post-synaptic neuron, code for adapting the weight of synapse based on at least one of a resource (resource consideration) associated with the synapse, a time since a last change of the weight, or spike timing of the pre-synaptic neuron and the post-synaptic neuron, code for determining the resource consideration based on one or more timing relations between prior spikes of the pre-synaptic and post-synaptic neurons, and code for determining the resource consideration based on an amount of time since a prior commitment to a change of the weight.

Figure 10:
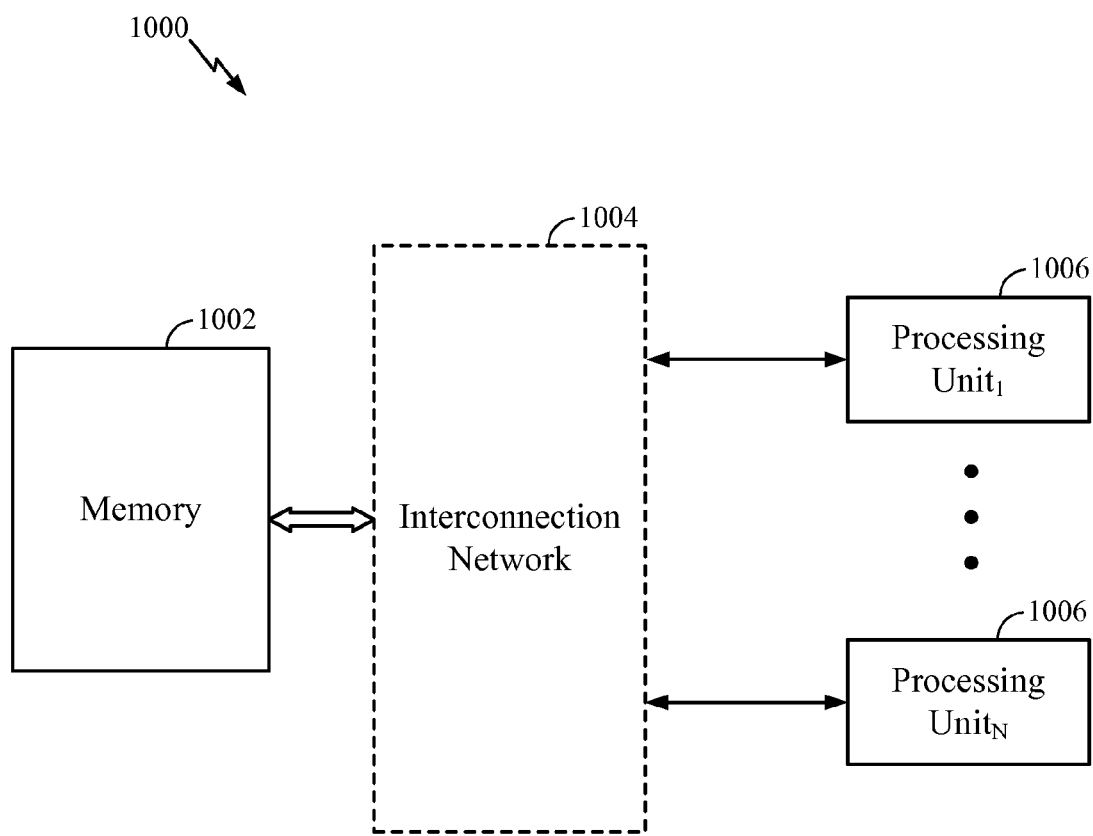
FIG. 10 illustrates an example implementation of neural learning where a memory may be interfaced with individual distributed processing units in accordance with certain aspects of the present disclosure.

FIG. 10 illustrates an example implementation 1000 of the aforementioned method for neural learning where a memory 1002 can be interfaced via an interconnection network 1004 with individual (distributed) processing units (neural processors) 1006 of a computational network (neural network) in accordance with certain aspects of the present disclosure. One or more weights associated with one or more connections (synapses) of the computational network (neural network) may be loaded from the memory 1002 via connection(s) of the interconnection network 1004 into each processing unit (neural processor) 1006. In an aspect of the present disclosure, the processing unit 1006 may be configured to modulate an input from a pre-synaptic neuron to a post-synaptic neuron by a weight of a synapse connecting the pre-synaptic neuron and the post-synaptic neuron, adapt the weight of synapse based on at least one of a resource (resource consideration) associated with the synapse, a time since a last change of the weight, or spike timing of the pre-synaptic neuron and the post-synaptic neuron, determine the resource consideration based on one or more timing relations between prior spikes of the pre-synaptic and post-synaptic neurons, and determine the resource consideration based on an amount of time since a prior commitment to a change of the weight.

Figure 11:
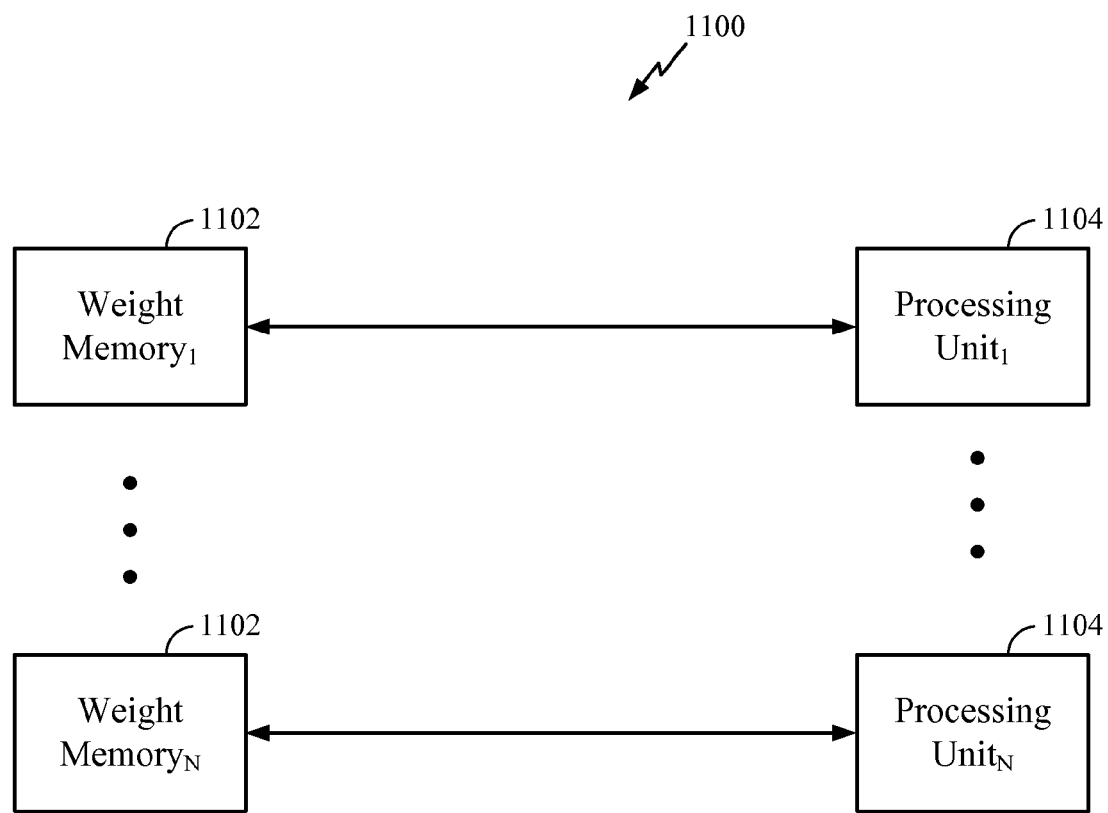
FIG. 11 illustrates an example implementation of neural learning based on distributed memories and distributed processing units in accordance with certain aspects of the present disclosure.

FIG. 11 illustrates an example implementation 1100 of the aforementioned method for neural learning based on distributed weight memories 1102 and distributed processing units (neural processors) 1104 in accordance with certain aspects of the present disclosure. As illustrated in FIG. 11, one memory bank 1102 may be directly interfaced with one processing unit 1104 of a computational network (neural network), wherein that memory bank 1102 may store one or more weights of one or more connections (synapses) associated with that processing unit (neural processor) 1104. In an aspect of the present disclosure, the processing unit 1104 may be configured to modulate an input from a pre-synaptic neuron to a post-synaptic neuron by a weight of a synapse connecting the pre-synaptic neuron and the post-synaptic neuron, adapt the weight of synapse based on at least one of a resource (resource consideration) associated with the synapse, a time since a last change of the weight, or spike timing of the pre-synaptic neuron and the post-synaptic neuron, determine the resource consideration based on one or more timing relations between prior spikes of the pre-synaptic and post-synaptic neurons, and determine the resource consideration based on an amount of time since a prior commitment to a change of the weight.

Figure 6A:
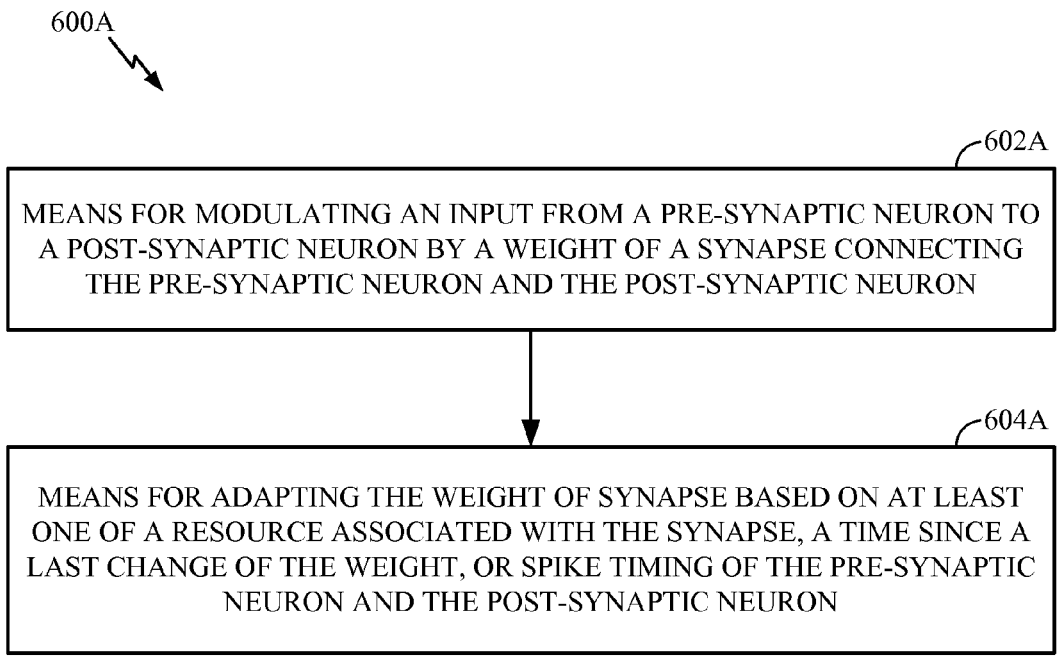
FIG. 6A illustrates example components capable of performing the operations illustrated in FIG. 6.
Figure 7A:
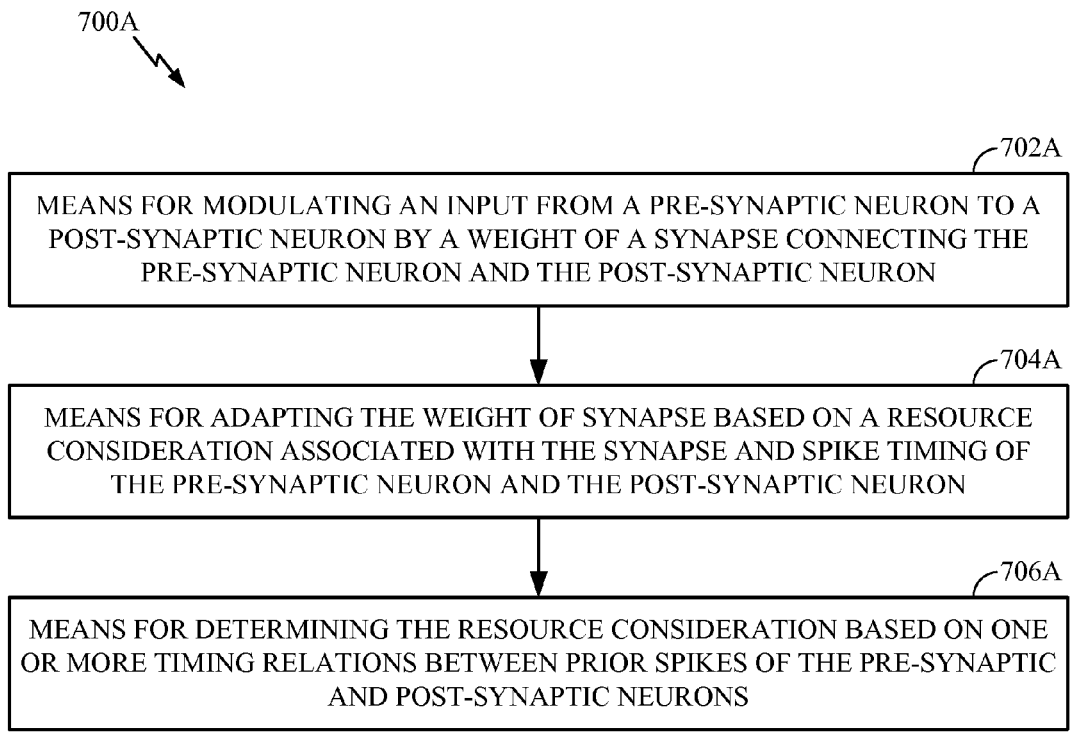
FIG. 7A illustrates example components capable of performing the operations illustrated in FIG. 7.
Figure 8A:
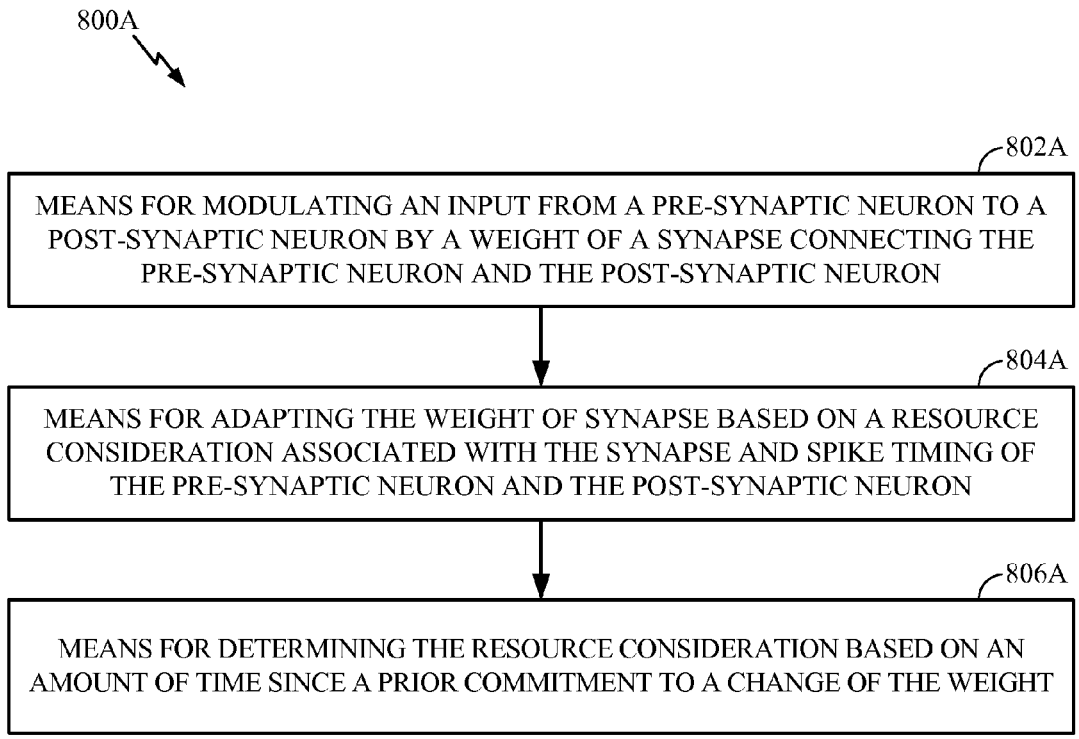
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600, 700 and 800 illustrated in FIGS. 6, 7 and 8 correspond to components 600A, 700A and 800A illustrated in FIGS. 6A, 7A and 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of neural learning, comprising:
   modulating an input from a pre-synaptic neuron to a post-synaptic neuron by a weight of a synapse connecting the pre-synaptic neuron and the post-synaptic neuron; and
   adapting the weight of the synapse based on a resource associated with the synapse, wherein a value of the resource is modified as a function of time relative to adapting the weight of the synapse, such that the value of the resource is recovered over time towards a previous value before the modification.

2. The method of claim 1, further comprising:
   modifying the resource in relation to adapting the weight of synapse; and
   recovering the resource over time towards a value of the resource before the modification.

3. The method of claim 2, wherein modifying the resource comprises decreasing the resource.

4. The method of claim 3, wherein the resource is decreased by an amount proportional to an absolute value of a change in the weight of synapse during the adaptation.

5. The method of claim 3, wherein the resource is decreased to zero, if an absolute value of a change in the weight of synapse during the adaptation is above a threshold.

6. The method of claim 2, wherein recovering the resource over time comprises:
   recovering, after a time delay, the resource to the value before the modification.

7. The method of claim 2, wherein modifying the resource occurs when committing to adapting the weight.

8. The method of claim 2, wherein:
   modifying the resource occurs when determining an aspect of adapting the weight, and
   adapting the weight occurs at a later time.

9. The method of claim 8, wherein the aspect of adapting the weight comprises at least one of: an amount of a change in the weight, or a direction of a change in the weight.

10. The method of claim 1, wherein a change in the weight of synapse during the adaptation is not applied, if the resource is below a threshold.

11. The method of claim 1, wherein a change in the weight of synapse during the adaptation is not applied, if the time since the last change is below a threshold.

12. The method of claim 1, wherein adapting the weight of synapse further comprises:
   updating the weight of synapse effective at a time of spiking of the post-synaptic neuron or the pre-synaptic neuron;
   storing, at a time of the weight update, a time of updating the weight as a last time the resource was used;
   computing the resource at another time of updating the weight as a function of the other time and the last time the resource was used; and
   obtaining a change in the weight of synapse as a function of the computed resource.

13. The method of claim 12, wherein a value of the last time the resource was used is not overwritten, if a magnitude of the change in the weight of synapse is below a threshold.

14. The method of claim 12, wherein the change in the weight is zero, if a value of the other time minus the last time the resource was used is smaller than a threshold.

15. An apparatus for neural learning, comprising:
   a first circuit configured to modulate an input from a pre-synaptic neuron to a post-synaptic neuron by a weight of a synapse connecting the pre-synaptic neuron and the post-synaptic neuron; and
   a second circuit configured to adapt the weight of the synapse based on a resource associated with the synapse, wherein a value of the resource is modified as a function of time relative to adapting the weight of the synapse, such that the value of the resource is recovered over time towards a previous value before the modification.

16. The apparatus of claim 15, further comprising:
   a third circuit configured to modify the resource in relation to adapting the weight of synapse; and
   a fourth circuit configured to recover the resource over time towards a value of the resource before the modification.

17. The apparatus of claim 16, wherein modifying the resource comprises decreasing the resource.

18. The apparatus of claim 17, wherein the resource is decreased by an amount proportional to an absolute value of a change in the weight of synapse during the adaptation.

19. The apparatus of claim 17, wherein the resource is decreased to zero, if an absolute value of a change in the weight of synapse during the adaptation is above a threshold.

20. The apparatus of claim 16, wherein the fourth circuit is also configured to:
   recover, after a time delay, the resource to the value before the modification.

21. The apparatus of claim 16, wherein modifying the resource occurs when committing to adapting the weight.

22. The apparatus of claim 16, wherein:
   modifying the resource occurs when determining an aspect of adapting the weight, and
   adapting the weight occurs at a later time.

23. The apparatus of claim 22, wherein the aspect of adapting the weight comprises at least one of: an amount of a change in the weight, or a direction of a change in the weight.

24. The apparatus of claim 15, wherein a change in the weight of synapse during the adaptation is not applied, if the resource is below a threshold.

25. The apparatus of claim 15, wherein a change in the weight of synapse during the adaptation is not applied, if the time since the last change is below a threshold.

26. The apparatus of claim 15, wherein the second circuit is also configured to:
update the weight of synapse effective at a time of spiking of the post-synaptic neuron or the pre-synaptic neuron;
store, at a time of the weight update, a time of updating the weight as a last time the resource was used;
compute the resource at another time of updating the weight as a function of the other time and the last time the resource was used; and
obtain a change in the weight of synapse as a function of the computed resource.

27. The apparatus of claim 26, wherein a value of the last time the resource was used is not overwritten, if a magnitude of the change in the weight of synapse is below a threshold.

28. The apparatus of claim 26, wherein the change in the weight is zero, if a value of the other time minus the last time the resource was used is smaller than a threshold.

29. An apparatus for neural learning, comprising:
means for modulating an input from a pre-synaptic neuron to a post-synaptic neuron by a weight of a synapse connecting the pre-synaptic neuron and the post-synaptic neuron; and
means for adapting the weight of the synapse based on a resource associated with the synapse, wherein a value of the resource is modified as a function of time relative to adapting the weight of the synapse, such that the value of the resource is recovered over time towards a previous value before the modification.

30. The apparatus of claim 29, further comprising:
means for modifying the resource in relation to adapting the weight of synapse; and
means for recovering the resource over time towards a value of the resource before the modification.

31. The apparatus of claim 30, wherein the means for modifying the resource comprises means for decreasing the resource.

32. The apparatus of claim 31, wherein the resource is decreased by an amount proportional to an absolute value of a change in the weight of synapse during the adaptation.

33. The apparatus of claim 31, wherein the resource is decreased to zero, if an absolute value of a change in the weight of synapse during the adaptation is above a threshold.

34. The apparatus of claim 30, wherein the means for recovering the resource over time comprises:
means for recovering, after a time delay, the resource to the value before the modification.

35. The apparatus of claim 30, wherein modifying the resource occurs when committing to adapting the weight.

36. The apparatus of claim 30, wherein:
modifying the resource occurs when determining an aspect of adapting the weight, and
adapting the weight occurs at a later time.

37. The apparatus of claim 36, wherein the aspect of adapting the weight comprises at least one of: an amount of a change in the weight, or a direction of a change in the weight.

38. The apparatus of claim 29, wherein a change in the weight of synapse during the adaptation is not applied, if the resource is below a threshold.

39. The apparatus of claim 29, wherein a change in the weight of synapse during the adaptation is not applied, if the time since the last change is below a threshold.

40. The apparatus of claim 29, wherein the means for adapting the weight of synapse comprises:
means for updating the weight of synapse effective at a time of spiking of the post-synaptic neuron or the pre-synaptic neuron;
means for storing, at a time of the weight update, a time of updating the weight as a last time the resource was used;
means for computing the resource at another time of updating the weight as a function of the other time and the last time the resource was used; and
means for obtaining a change in the weight of synapse as a function of the computed resource.

41. The apparatus of claim 40, wherein a value of the last time the resource was used is not overwritten, if a magnitude of the change in the weight of synapse is below a threshold.

42. The apparatus of claim 40, wherein the change in the weight is zero, if a value of the other time minus the last time the resource was used is smaller than a threshold.

43. A computer program product for neural learning, comprising a non-transitory computer-readable medium comprising code for:
modulating an input from a pre-synaptic neuron to a post-synaptic neuron by a weight of a synapse connecting the pre-synaptic neuron and the post-synaptic neuron; and
adapting the weight of the synapse based on a resource associated with the synapse, wherein a value of the resource is modified as a function of time relative to adapting the weight of the synapse, such that the value of the resource is recovered over time towards a previous value before the modification.

44. The computer program product of claim 43, wherein the non-transitory computer-readable medium further comprises code for:
modifying the resource in relation to adapting the weight of synapse; and
recovering the resource over time towards a value of the resource before the modification.

45. The computer program product of claim 44, wherein modifying the resource comprises decreasing the resource.

46. The computer program product of claim 45, wherein the resource is decreased by an amount proportional to an absolute value of a change in the weight of synapse during the adaptation.

47. The computer program product of claim 45, wherein the resource is decreased to zero, if an absolute value of a change in the weight of synapse during the adaptation is above a threshold.

48. The computer program product of claim 44, wherein the non-transitory computer-readable medium further comprises code for:
recovering, after a time delay, the resource to the value before the modification.

49. The computer program product of claim 44, wherein modifying the resource occurs when committing to adapting the weight.

50. The computer program product of claim 44, wherein:
modifying the resource occurs when determining an aspect of adapting the weight, and
adapting the weight occurs at a later time.

51. The computer program product of claim 50, wherein the aspect of adapting the weight comprises at least one of: an amount of a change in the weight, or a direction of a change in the weight.

52. The computer program product of claim 43, wherein a change in the weight of synapse during the adaptation is not applied, if the resource is below a threshold.

53. The computer program product of claim 43, wherein a change in the weight of synapse during the adaptation is not applied, if the time since the last change is below a threshold.

54. The computer program product of claim 43, wherein the non-transitory computer-readable medium further comprises code for:
updating the weight of synapse effective at a time of spiking of the post-synaptic neuron or the pre-synaptic neuron;
storing, at a time of the weight update, a time of updating the weight as a last time the resource was used;
computing the resource at another time of updating the weight as a function of the other time and the last time the resource was used; and
obtaining a change in the weight of synapse as a function of the computed resource.

55. The computer program product of claim 54, wherein a value of the last time the resource was used is not overwritten, if a magnitude of the change in the weight of synapse is below a threshold.

56. The computer program product of claim 54, wherein the change in the weight is zero, if a value of the other time minus the last time the resource was used is smaller than a threshold.

57. A method of neural learning, comprising:
modulating an input from a pre-synaptic neuron to a post-synaptic neuron by a weight of a synapse connecting the pre-synaptic neuron and the post-synaptic neuron;
adapting the weight of synapse based on a resource consideration associated with the synapse and spike timing of the pre-synaptic neuron and the post-synaptic neuron; and
determining the resource consideration based on one or more timing relations between prior spikes of the pre-synaptic and post-synaptic neurons.

58. The method of claim 57, wherein the one or more timing relations comprise information about a time difference between a pair of the prior spikes of the pre-synaptic and post-synaptic neurons.

59. The method of claim 57, wherein the one or more timing relations comprise information about a time difference between a pair of the prior spikes and another pair of the prior spikes.

60. The method of claim 57, wherein the one or more timing relations comprise information about a time since a pair of the prior spikes occurred.

61. An apparatus for neural learning, comprising:
a first circuit configured to modulate an input from a pre-synaptic neuron to a post-synaptic neuron by a weight of a synapse connecting the pre-synaptic neuron and the post-synaptic neuron;
a second circuit configured to adapt the weight of synapse based on a resource consideration associated with the synapse and spike timing of the pre-synaptic neuron and the post-synaptic neuron; and
a third circuit configured to determine the resource consideration based on one or more timing relations between prior spikes of the pre-synaptic and post-synaptic neurons.

62. The apparatus of claim 61, wherein the one or more timing relations comprise information about a time difference between a pair of the prior spikes of the pre-synaptic and post-synaptic neurons.

63. The apparatus of claim 61, wherein the one or more timing relations comprise information about a time difference between a pair of the prior spikes and another pair of the prior spikes.

64. The apparatus of claim 61, wherein the one or more timing relations comprise information about a time since a pair of the prior spikes occurred.

65. An apparatus for neural learning, comprising:
means for modulating an input from a pre-synaptic neuron to a post-synaptic neuron by a weight of a synapse connecting the pre-synaptic neuron and the post-synaptic neuron;
means for adapting the weight of synapse based on a resource consideration associated with the synapse and spike timing of the pre-synaptic neuron and the post-synaptic neuron; and
means for determining the resource consideration based on one or more timing relations between prior spikes of the pre-synaptic and post-synaptic neurons.

66. The apparatus of claim 65, wherein the one or more timing relations comprise information about a time difference between a pair of the prior spikes of the pre-synaptic and post-synaptic neurons.

67. The apparatus of claim 65, wherein the one or more timing relations comprise information about a time difference between a pair of the prior spikes and another pair of the prior spikes.

68. The apparatus of claim 65, wherein the one or more timing relations comprise information about a time since a pair of the prior spikes occurred.

69. A computer program product for neural learning, comprising a non-transitory computer-readable medium comprising code for:
modulating an input from a pre-synaptic neuron to a post-synaptic neuron by a weight of a synapse connecting the pre-synaptic neuron and the post-synaptic neuron;
adapting the weight of synapse based on a resource consideration associated with the synapse and spike timing of the pre-synaptic neuron and the post-synaptic neuron; and
determining the resource consideration based on one or more timing relations between prior spikes of the pre-synaptic and post-synaptic neurons.

70. The computer program product of claim 69, wherein the one or more timing relations comprise information about a time difference between a pair of the prior spikes of the pre-synaptic and post-synaptic neurons.

71. The computer program product of claim 69, wherein the one or more timing relations comprise information about a time difference between a pair of the prior spikes and another pair of the prior spikes.

72. The computer program product of claim 69, wherein the one or more timing relations comprise information about a time since a pair of the prior spikes occurred.

73. A method of neural learning, comprising:
modulating an input from a pre-synaptic neuron to a post-synaptic neuron by a weight of a synapse connecting the pre-synaptic neuron and the post-synaptic neuron;
adapting the weight of synapse based on a resource consideration associated with the synapse and spike timing of the pre-synaptic neuron and the post-synaptic neuron; and
determining the resource consideration based on an amount of time since a prior commitment to a change of the weight.

74. The method of claim 73, wherein the change of weight occurs a time after committing to the change of weight.

75. An apparatus for neural learning, comprising:
- a first circuit configured to modulate an input from a pre-synaptic neuron to a post-synaptic neuron by a weight of a synapse connecting the pre-synaptic neuron and the post-synaptic neuron;
- a second circuit configured to adapt the weight of synapse based on a resource consideration associated with the synapse and spike timing of the pre-synaptic neuron and the post-synaptic neuron; and
- a third circuit configured to determine the resource consideration based on an amount of time since a prior commitment to a change of the weight.

76. The apparatus of claim 75, wherein the change of weight occurs a time after committing to the change of weight.

77. An apparatus for neural learning, comprising:
- means for modulating an input from a pre-synaptic neuron to a post-synaptic neuron by a weight of a synapse connecting the pre-synaptic neuron and the post-synaptic neuron;
- means for adapting the weight of synapse based on a resource consideration associated with the synapse and spike timing of the pre-synaptic neuron and the post-synaptic neuron; and
- means for determining the resource consideration based on an amount of time since a prior commitment to a change of the weight.

78. The apparatus of claim 77, wherein the change of weight occurs a time after committing to the change of weight.

79. A computer program product for neural learning, comprising a non-transitory computer-readable medium comprising code for:
- modulating an input from a pre-synaptic neuron to a post-synaptic neuron by a weight of a synapse connecting the pre-synaptic neuron and the post-synaptic neuron;
- adapting the weight of synapse based on a resource consideration associated with the synapse and spike timing of the pre-synaptic neuron and the post-synaptic neuron; and
- determining the resource consideration based on an amount of time since a prior commitment to a change of the weight.

80. The computer program product of claim 79, wherein the change of weight occurs a time after committing to the change of weight.

* * * * *